(12) United States Patent
Kato et al.

(10) Patent No.: US 8,350,801 B2
(45) Date of Patent: Jan. 8, 2013

(54) DISPLAY DEVICE

(75) Inventors: Hiromi Kato, Nara (JP); Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 666 days.

(21) Appl. No.: 11/886,225

(22) PCT Filed: Mar. 15, 2006

(86) PCT No.: PCT/JP2006/305164
§ 371 (c)(1),
(2), (4) Date: Sep. 13, 2007

(87) PCT Pub. No.: WO2006/098383
PCT Pub. Date: Sep. 21, 2006

(65) Prior Publication Data
US 2008/0252939 A1    Oct. 16, 2008

(30) Foreign Application Priority Data

Mar. 16, 2005 (JP) .................................. 2005-074506

(51) Int. Cl.
*G06F 3/038* (2006.01)
(52) U.S. Cl. ........................................ 345/104; 345/175
(58) Field of Classification Search .................. 345/173, 345/175, 204, 104, 207; 178/18.01, 18.09
See application file for complete search history.

(56) References Cited

U.S. PATENT DOCUMENTS

| 5,313,055 | A | * | 5/1994 | Shiratsuki et al. | ......... 250/208.1 |
| 5,675,357 | A | | 10/1997 | Yoshida et al. | |
| 5,825,011 | A | | 10/1998 | Suzuki et al. | |
| 5,920,401 | A | * | 7/1999 | Street et al. | .................... 358/400 |
| 6,243,069 | B1 | | 6/2001 | Ogawa et al. | |
| 6,295,043 | B1 | * | 9/2001 | Hashimoto et al. | ............. 345/96 |
| 2001/0015716 | A1 | * | 8/2001 | Kim | ................................ 345/96 |

FOREIGN PATENT DOCUMENTS

| JP | 61-101827 A | 5/1986 |
| JP | 63-163886 | 7/1988 |
| JP | 63-163886 A | 7/1988 |
| JP | 05-40927 | 2/1993 |
| JP | 05-89230 | 4/1993 |
| JP | 5-89230 A | 4/1993 |
| JP | 06-141214 | 5/1994 |
| JP | 07-220019 | 8/1995 |
| JP | 2000-152205 | 5/2000 |

OTHER PUBLICATIONS

International Search Report mailed Jun. 13, 2006.
International Preliminary Report on Patentability mailed Sep. 27, 2007 in corresponding PCT Application No. PCT/JP2006/305164.
Notice of Reasons for Rejection mailed Feb. 22, 2011.

* cited by examiner

*Primary Examiner* — Amare Mengistu
*Assistant Examiner* — Koosha Sharifi-Tafreshi
(74) *Attorney, Agent, or Firm* — Nixon & Vanderhye P.C.

(57) ABSTRACT

A display apparatus according to the present invention comprises a plurality of pixel sections 150 and performs an image display operation and an image reading operation. The plurality of pixel sections 150 each include a light output section 160 for outputting first light, and a light receiving section 102 for receiving reflected light obtained as a result of an imaging subject being irradiated with the first light. The apparatus further comprises a directivity adjusting section for adjusting a directivity of the first light. The plurality of pixel sections 150 are divided into a plurality of groups. The light output section 160 outputs the first light and the light receiving section 102 receives the reflected light on a group-by-group basis.

8 Claims, 9 Drawing Sheets

DISPLAY DEVICE

This application is the U.S. national phase of International Application No. PCT/JP2006/305164 filed Mar. 15, 2006 which designated the U.S. and claims priority to JP 2005-074506 filed 16 Mar. 2005, the entire contents of each of which are hereby incorporated by reference.

TECHNICAL FIELD

The present invention relates to a display apparatus for performing an image reading operation as well as an image display operation.

BACKGROUND ART

Some display devices for performing an image display operation and an image reading operation have been proposed (see patent documents 1 through 4).

An image input/output device disclosed by patent document 1 includes an image input/output panel, in which a plurality of light emitting element/light receiving element pairs located in a matrix on a plane. The light emitting elements act as display elements. For performing an image display operation, the light emitting elements are driven based on image information. An image reading operation is performed as follows. First, a sheet of paper on which color gradation information of letters or the like is recorded is placed on the image input/output panel, such that the surface having the information faces the image input/output panel. The light emitting elements emit light in this state to irradiate the paper with light. The reflected light is received by the receiving elements. Thus, the image information is obtained.

Patent document 2 discloses a display/input liquid crystal panel, in which a receiving element is incorporated in each of pixels. An image reading operation is performed as follows. A sheet of paper is irradiated with light, and light reflected by the paper or light transmitted through the paper is incident on the display/input liquid crystal panel and received by the receiving elements. Thus, image information is obtained.

Patent document 3 discloses an image reading/display device, in which light receiving elements are incorporated in a liquid crystal panel of a passive matrix system. Image information is obtained in substantially the same manner as the display/input liquid crystal panel disclosed by patent document 2.

When a display device as described above in which receiving elements are incorporated in a liquid crystal panel performs an image reading operation, the liquid crystal cell acts as a light emitting element. Light emitted by backlight or the like is transmitted through the liquid crystal panel to irradiate a document sheet or the like. The obtained reflected light is received by the receiving elements.

Hereinafter, an operation of these conventional display devices will be described.

FIG. 12 schematically shows an image input/output device 500 disclosed by patent document 1. The input/output device 500 includes a rectangular substrate 501 and a plurality of pixel sections 502 located in a matrix of m×n on the substrate 501. FIG. 13 shows the pixel sections 502 in more detail. Each of the pixel sections 502 includes a light emitting element 502a/light receiving element 502b pair. The light emitting element 502a is, for example, a light emitting diode, and the light receiving element 502b is, for example, a phototransistor. The light emitting element 502a and the light receiving element 502b are located adjacent to each other, with a light emitting face of the light emitting element 502a and a light receiving face of the light receiving element 502b being directed upward.

Next, with reference to FIG. 14A and FIG. 14B, an operation of the image input/output device 500 will be described. For an image display operation, the image input/output device 500 performs substantially the same operation as a dot-matrix system display device. As shown in FIG. 14A, the light emitting elements 502a corresponding to dots are each put to an ON state or an OFF state based on image information to display two-dimensional graphics, letters and or like. For an image reading operation, as shown in FIG. 14B, a document sheet 503 having graphics, letters or the like drawn thereon is placed on the image input/output device 500. At this point, the document sheet 503 is placed such that a surface thereof having ink 504 used for drawing the graphics or letters faces the pixel sections 502. The light emitting elements 502a emit light sequentially, and light reflected by the document sheet 503 is received by the light receiving elements 502b. Light reflected on an area of the document surface which has the ink 504 and thus has a relatively lower reflectance is weaker; whereas light reflected on an area of the document surface which has no ink 504 and thus has a relatively higher reflectance is stronger. The intensity of the reflected light is represented with binary data in this manner, and thus image information representing the color gradation pattern on the document sheet 503 is obtained.

The display devices disclosed by patent documents 2 and 3 use liquid crystal cells instead of the light emitting elements, but operate fundamentally in the same manner as above.

FIG. 15 schematically shows a display/input liquid crystal panel 600 disclosed by patent document 2. The display/input liquid crystal panel 600 includes a plurality of pixel sections 650, a plurality of gate lines 606, a plurality of source lines 607, and a plurality of signal lines 608. For the simplicity of explanation, FIG. 15 only shows one of each type of elements. The gate line 606, the source line 607, and the signal line 608 are provided on a substrate (not shown) in a lattice. The source line 607 and the signal line 608 are located alternately and parallel to each other. The gate line 606 are located as crossing the source line 607 and the signal line 608. At an intersection of the gate line 606 and the source line 607, the pixel section 650 is provided.

The pixel section 650 includes a liquid crystal cell 660 and a thin film light sensor 602. The thin film light sensor 602 acts as a light receiving element. The liquid crystal cell 660 includes a thin film transistor 601 as a switching element and a pixel capacitance 605. The gate line 606 is connected to a gate electrode of the thin film transistor 601, and the source line 607 is connected to a source electrode of the thin film transistor 601. The pixel capacitance 605 includes, for example, a liquid crystal capacitance and a storage capacitance (not shown) provided parallel to the liquid crystal capacitance. The liquid crystal capacitance includes, for example, a pixel electrode (not shown), a counter electrode (not shown) facing the pixel electrode, and a liquid crystal layer (not shown) provided between the pixel electrode and the counter electrode. A drain electrode of the thin film transistor 601 is connected to the pixel electrode.

The thin film light sensor 602 is located in the vicinity of an intersection of the gate line 606 and the signal line 608. One of two ends of the thin film light sensor 602 is connected to the gate line 606, and the other end of the thin film light sensor 602 is connected to the signal line 608 via the diode 603.

When a voltage corresponding to image information is applied to the gate line 606 and the source line 607, the thin film transistor 601 is put to an ON state to apply a voltage to the pixel electrode. Thus, an image is displayed. When a prescribed voltage is applied to the gate line 606, an electric current of a value corresponding to the intensity of the light incident on the thin film light sensor 602 flows from the gate line 606 to the signal line 608 via the thin film light sensor 602 and the diode 603. For example, as the light intensity increases, the value of the electric current increases. By detecting the value of the electric current, the intensity of the light received by the thin film light sensor 602 is detected. The diode 603 is provided for preventing the electric current from flowing from the signal line 608 to a gate line 606 which is not selected (i.e., which is not supplied with a voltage).

FIG. 16 shows the thin film transistor 601 and the thin film light sensor 602 in more detail. The thin film transistor 601 and the thin film light sensor 602 are provided on one substrate 611 of the liquid crystal panel.

The thin film transistor 601 includes a gate electrode 612a, a gate insulating layer 613, a semiconductor layer 614, a highly doped layer 615, and a drain electrode 609. The gate electrode 612a is connected to the gate line 606. The drain electrode 609 and the source line 607 are connected to the semiconductor layer 614 via the highly doped layer 615. The highly doped layer 615 connected to the source line 607 acts as the source electrode of the thin film transistor 601. The drain electrode 609 is connected to the transparent pixel electrode. A light shielding film 616 is provided above a channel region of the semiconductor layer 614. The light shielding film 616 prevents malfunction caused by the semiconductor layer 614 being irradiated with external light.

The thin film transistor 602 includes a light shielding film 625, an insulating layer 626, a semiconductor layer 627, a highly doped layer 628, metal layers 623 and 629, and a gate electrode 612b. The semiconductor layer 627 is photoconductive. The gate electrode 612b is connected to the gate line 606.

The diode 603 includes a light shielding film 618, an insulating film 619, a semiconductor layer 620, a highly doped layer 621, and a metal layer 622. A light shielding film 624 is provided above the semiconductor layer 620. The metal layer 622 is connected to the signal line 608. The signal line 608 and the semiconductor layer 620 are connected to each other via the metal layer 622. The metal layer 623 and the semiconductor layer 620 are connected to each other via the highly doped layer 621. The diode 603 and the thin film light sensor 602 are connected to each other via the metal layer 623. The gate line 606 and the signal line 608 are connected to each other via the thin film light sensor 602 and the diode 603.

When a voltage is applied to the gate line 606, a voltage is applied to the gate electrode 612a of the thin film transistor 601 to form a carrier in the channel region in the semiconductor layer 614. When a voltage is applied to the source line 607 in this state, an electric current flows from the source line 607 to the drain electrode 609 via the semiconductor layer 614 to apply a voltage to the pixel electrode. By applying a voltage corresponding to image information to the gate lines 606 and the source lines 607 sequentially selected, a desired liquid crystal cell 660 is driven and thus an image is displayed.

When a voltage is applied to the gate line 606, a voltage is applied to the gate electrode 612b of the thin film light sensor 602. When the thin film light sensor 602 is irradiated with external light in this state, the semiconductor layer 627 becomes conductive. Thus, an electric current flows from the gate line 606 to the signal line 608 via the thin film light sensor 602 and the diode 603. More specifically, the electric current flows from the gate line 606 via the gate electrode 612b, the metal layer 629, the highly doped layer 628, the semiconductor layer 627, the highly doped layer 628, the metal layer 623, the highly doped layer 621, the semiconductor layer 620 and the metal layer 622 to the signal line 608.

The intensity of the light irradiating each thin film light sensor 602 connected to the gate line 606 supplied with a voltage is detected from the value of the electric current flowing in the corresponding signal line 608. By sequentially applying a voltage to the gate lines 606 to switch each pixel section 650 to an ON state or an OFF state and also detecting the value of the electric current flowing in the corresponding signal lines 608 sequentially, two-dimensional image information (color gradation pattern on the document sheet, etc.) is read.

Now, problems of the image input/output device 500 (FIG. 13) will be described.

The image input/output device 500 involves a problem that a sufficiently high resolution is not obtained for an image reading operation due to the low directivity of the light which is output from the light emitting element 502a. FIG. 17 shows an image reading operation of the image input/output device 500. Light which is output from the light emitting element 502a is reflected at point d on a printing face of the document sheet 503, and the reflected light is incident on the light receiving element 502b paring with the light emitting element 502a. In this case, the light travels on light path a. If only the light traveling on light path a is incident on the light receiving element 502b, the reflected light which is input to the light receiving element 502b has an intensity representing the color thickness of the printing only at point d. As a result, a sufficiently high resolution is obtained.

However, in general, the light which is output from the light emitting element 502a has low directivity and expands in other directions as well as traveling on light path a. For example, as shown in FIG. 18, the light output from the light emitting element 502a has a directivity characteristic of expanding widely with respect to the line vertical to the light emitting face. Therefore, as shown in FIG. 17, light traveling on light paths b and c and the like is also incident on the light receiving element 502b of interest in addition to the light traveling on light path a. The light paths b and c are for the light output from the pixel sections adjacent to the pixel section 502 of interest. The light receiving element 502b receives light reflected at points e and f on the document sheet 503 and traveling on light paths b and c together with the light reflected at point d and traveling on light path a. Namely, light reflected at a plurality of points on the document sheet 503 is incident on one light receiving element 502b at the same time.

When light reflected at a plurality of points on the document sheet 503 is incident on one light receiving element 502b at the same time, the color thickness information regarding one point on the document sheet 503 is also detected by a plurality of light receiving elements 502b located in the vicinity of the corresponding light receiving element 502b. Hence, the color thickness level of each point represented by the obtained color gradation information is blurred. Therefore, there arises the problem that a sufficiently high resolution is not obtained for the image reading operation.

Such a problem occurs also in the case of the display devices disclosed by patent documents 2 and 3 in a similar manner. FIG. 19 shows light which is output from the liquid crystal cell 660. Light output from a backlight 672 and reaching a liquid crystal panel 671 is transmitted through the liquid crystal cell 660 in an ON state and is output. When the directivity of the light output from the backlight 672 is low, light 675 output from the liquid crystal cell 660 in the ON state travels in directions close to a horizontal direction to the surface of the liquid crystal panel 672 as well as a direction vertical thereto. Even when the liquid crystal cell 660 is in an OFF state, the liquid crystal cell 660 outputs light 676 in directions close to the horizontal direction to the surface of the liquid crystal panel 671. Namely, whether the liquid crystal cell 660 is in an ON state or an OFF state, the liquid crystal cell 660 outputs light to directions close to the horizontal direction to the surface the liquid crystal panel 671. Therefore, light reflected at a plurality of points on the document sheet is incident on one light receiving element at the same time. As a result, there arises the problem that a sufficiently high resolution is not obtained for the image reading operation.

In order to solve such problems, an image display/input device disclosed by patent document 4 includes a directivity plate provided between a display/input liquid crystal panel and a backlight. The directivity plate receives light output from the backlight on an incident face and outputs the light after changing the traveling direction of the light to a direction vertical to the incident face. By supplying light having such a high directivity to the display/input liquid crystal panel, light traveling in directions close to a horizontal direction to the surface of the liquid crystal panel 671 is suppressed both in the ON state and the OFF state. Since light with a high directivity is always output from each pixel section, the resolution of the image which is obtained in the image reading operation can be prevented from decreasing.

Patent Document No. 1: Japanese Patent Publication for Opposition No. 5-40927
Patent Document No. 2: Japanese Patent Application Laid-Open Publication No. 63-163886
Patent Document No. 3: Japanese Patent Application Laid-Open Publication No. 5-89230
Patent Document No. 4: Japanese Patent Application Laid-Open Publication No. 8-153179

DISCLOSURE OF INVENTION

Problems to be Solved by the Invention

However, with the image display/input device disclosed by patent document 4, each pixel section outputs light with a high directivity even for an image display operation. Therefore, the viewing angle becomes narrow to spoil the display quality.

In order to overcome the problems described above, the present invention has an object of providing a display apparatus capable of performing an image reading operation while maintaining the high display quality without decreasing the resolution.

Means for Solving the Problems

A display apparatus according to the present invention apparatus comprises a plurality of pixel sections and performs an image display operation and an image reading operation. The plurality of pixel sections each include a light output section for outputting first light, and a light receiving section for receiving reflected light obtained as a result of an imaging subject being irradiated with the first light. The display apparatus further comprises a directivity adjusting section for adjusting a directivity of the first light.

In one embodiment, the directivity adjusting section includes a plurality of light sources for outputting second light, and a light guide section for propagating the second light and outputting the second light to the plurality of pixel sections. A directivity of the second light which is output from the light guide section varies in accordance with a lighting pattern as a combination of an ON state and an OFF state of each of the plurality of light sources. The light outputting section transmits at least a part of the second light which is output from the light guide section and thus outputs the first light. The directivity adjusting section switches each of the plurality of light sources to the ON state or the OFF state to adjust the directivity of the second light and thus adjusts the directivity of the first light.

In one embodiment, the display apparatus further comprises a light source for outputting second light. The light outputting section transmits at least a part of the second light and thus outputs the first light. The directivity adjusting section is provided between the plurality of pixel sections and the light source, and adjusts a directivity of the second light and thus adjusts the directivity of the first light.

In one embodiment, the directivity adjusting section sets the directivity of the first light in the image reading operation higher than the directivity of the first light in the image display operation.

In one embodiment, the plurality of pixel sections are divided into a plurality of groups. The light output section outputs the first light and the light receiving section receives the reflected light on a group-by-group basis.

A display apparatus according to the present invention comprises a plurality of pixel sections and performs an image display operation and an image reading operation. The plurality of pixel sections each include a light output section for outputting first light, and a light receiving section for receiving reflected light obtained as a result of an imaging subject being irradiated with the first light. The plurality of pixel sections are divided into a plurality of groups. The light output section outputs the first light and the light receiving section receives the reflected light on a group-by-group basis.

In one embodiment, the display apparatus further comprises a generation section for detecting an intensity of the reflected light received by each of the plurality of light receiving sections belonging to the same group on a group-by-group basis, and generating image information based on the plurality of intensities of the reflected light detected on a group-by-group basis.

In one embodiment, among the plurality of pixel sections, the pixel sections belonging to the same group are located discretely from each other.

In one embodiment, plurality of pixel sections are arranged in a first direction and a second direction. A distance between the adjacent pixel sections, among the plurality of pixel sections, is shorter in the first direction than in the second direction. A degree of discreteness between the pixel sections belonging to same group is larger in the first direction than in the second direction.

In one embodiment, the plurality of pixel sections are arranged in a first direction and a second direction. The plurality of pixel sections are assigned prescribed types of colors in the first direction. A distance between the pixel sections assigned the same color, among the plurality of pixel sections, is shorter in the second direction than in the first direction. The pixel sections belonging to the same group are assigned the same color. A distance between the pixel sections belonging to same group in the second direction is equal to or greater than that in the first direction.

In one embodiment, the plurality of pixel sections are arranged in a first direction and a second direction. Among the plurality of pixel sections, the pixel sections belonging to the same group are located i pixel sections apart in the first direction (i is a positive integer) and j pixel sections apart in the second direction (j is a positive integer). The number of the plurality of groups is (i+1)×(j+1). The display apparatus further comprises a generation section for detecting an intensity of the reflected light received by each of the plurality of light receiving sections belonging to the same group on a group-by-group basis, and generating image information based on the plurality of intensities of the reflected light detected on a group-by-group basis.

In one embodiment, the display apparatus further comprises a control section for controlling the directivity adjusting section, for adjusting the directivity of the first light, in accordance with a scattering degree of the reflected light.

In one embodiment, the display apparatus further comprises a control section for controlling a degree of discreteness between the pixel sections belonging to the same group in accordance with a scattering degree of the reflected light.

In one embodiment, the control section determines the scattering degree of the reflected light based on the intensity of the reflected light received by each of the plurality of light receiving sections when the first light having a prescribed directivity is directed from at least one of the light output sections toward the imaging subject.

In one embodiment, the control section controls the directivity adjusting sections such that as the scattering degree of the reflected light is higher, the directivity of the first light is higher.

In one embodiment, the control section sets the degree of discreteness larger as the scattering degree is higher.

A display apparatus according to the present invention comprises a plurality of pixel sections and a light source for outputting light, and performs an image display operation and an image reading operation. The plurality of pixel sections each include a light output section for transmitting and outputting at least a part of the light, and a light receiving section for receiving reflected light obtained as a result of an imaging subject being irradiated with the light output from the light outputting section. A brightness of the light output from the light source is different between in the image display operation and in the image reading operation.

In one embodiment, the brightness of the light output from the light source is higher in the image reading operation than in the image display operation.

Effects of the Invention

A display apparatus according to the present invention includes a directivity adjusting section for adjusting the directivity of light which is output from the light output section. Owing to this, the directivity of the light can be set low for an image display operation and high in an image reading operation. Therefore, the image reading operation can be performed without decreasing the resolution while maintaining the high display quality.

A plurality of pixel sections included in the display apparatus according to the present invention are divided into a plurality of groups. The light output section outputs first light and the light receiving section receives the reflected light on a group-by-group basis. By selecting a plurality of pixel sections for an image reading operation at the time, the time for image reading can be shortened. In a structure where the pixel sections belonging to the same group are discretely located from each other, the phenomenon that the light receiving section of one pixel section receives the reflected light corresponding to the light output from another pixel section can be suppressed. This prevents the resolution of the obtained image from decreasing.

DESCRIPTION OF THE REFERENCE NUMERALS

Figure 1:
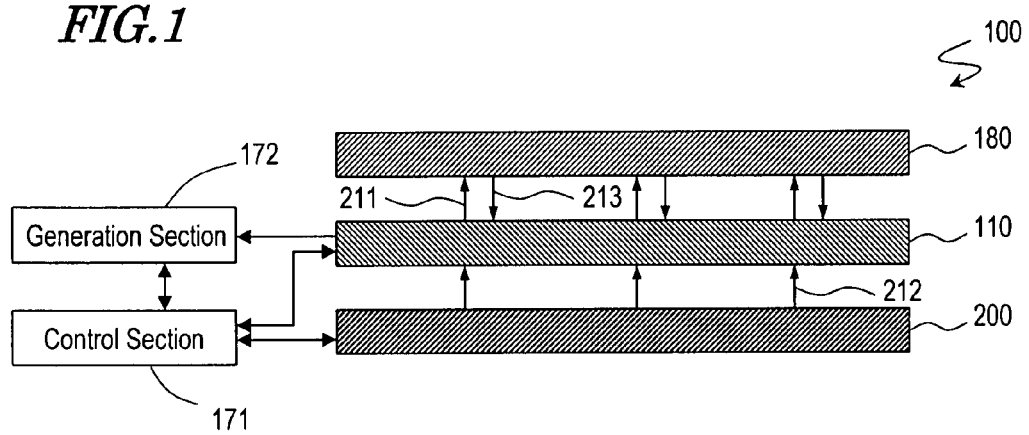
FIG. 1 schematically shows a liquid crystal display apparatus according to Embodiment 1 of the present invention.

100 Liquid crystal display apparatus
101 Thin film transistor
102 Thin film light sensor
103 Diode
105 Pixel capacitance
106 Gate line
107 Source line
108,108a,108b Signal line
110,110a Liquid crystal display panel
150 Pixel section
160 Liquid crystal cell
171 Control section
172 Generation section
180 Imaging subject
200 Illumination device
201A-201C Light source 202 Light guide plate
203 Microprism
204 Reflection plate
211,212 Light
231 Reflected light

BEST MODE FOR CARRYING OUT THE INVENTION

Hereinafter, embodiments of the present invention will be described with reference to the accompanying drawings. Like elements bear like reference numerals, and detailed descriptions thereof will be omitted.

Embodiment 1

FIG. 1 schematically shows a liquid crystal display apparatus 100 according to Embodiment 1 of the present invention. The liquid crystal display apparatus 100 performs an image display operation and an image reading operation. The liquid crystal display apparatus 100 includes a liquid crystal display panel 110, an illumination device 200, a control section 171, and a generation section 172. For an image reading operation, an imaging subject 180 (document sheet, photo, business card, etc.) is placed on the liquid crystal display panel 110 with a printing face thereof facing the liquid crystal display panel 110. The control section 171 controls an operation of the liquid crystal display panel 110 and the illumination device 200. For an image reading operation, the generation section 172 generates image information (color gradation pattern of the imaging subject 180 based on the intensity of received light.

Figure 2:
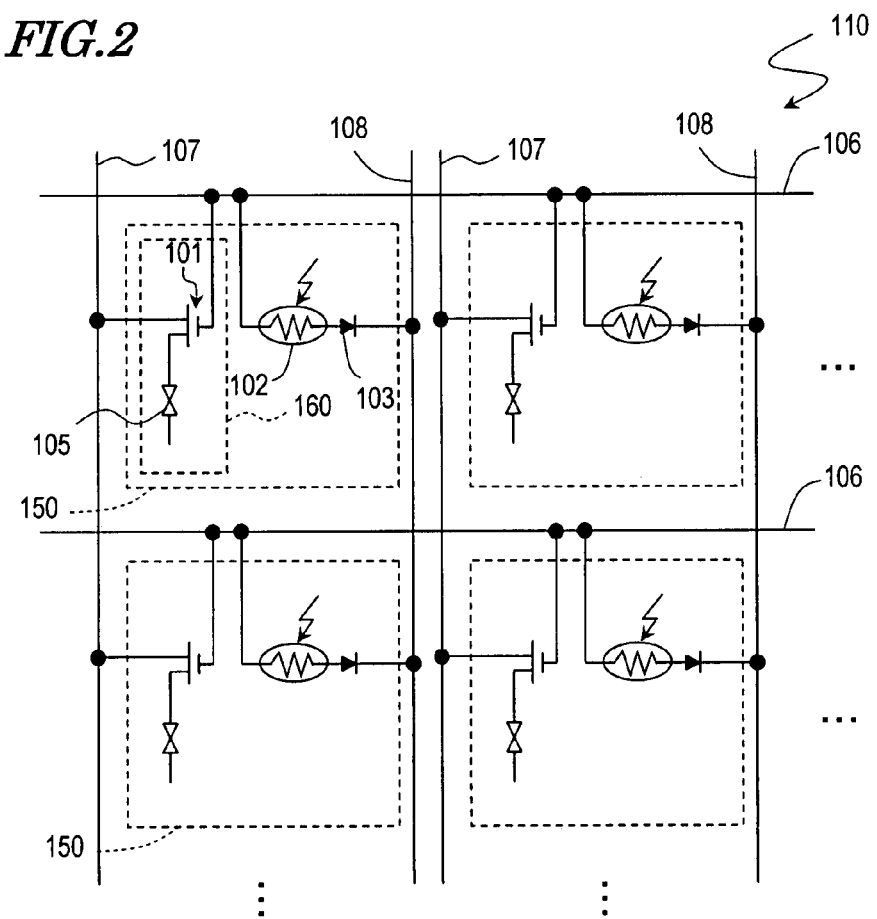
FIG. 2 schematically shows a liquid crystal display panel according to Embodiment 1 of the present invention.

FIG. 2 schematically shows the liquid crystal display panel 110. The liquid crystal display panel 110 includes a plurality of pixel sections 150, a plurality of gate lines 106, a plurality of source lines 107, and a plurality of signal lines 108. The gate lines 106, the source lines 107, and the signal lines 108 are provided on a substrate (not shown) in a lattice. The source lines 107 and the signal lines 108 are located alternately and parallel to each other. The gate lines 106 are located as crossing the source lines 107 and the signal lines 108. At each of intersections of the gate lines 106 and the source lines 107, the pixel section 150 is provided.

Each pixel section 150 includes a liquid crystal cell 160 and a thin film light sensor 102. The liquid crystal cell 160 acts as a light output section for outputting light 211 (FIG. 1). The liquid crystal cell 160 has functions of outputting the light 211 to display an image in an image display operation, and of outputting the light 211 to irradiate the imaging subject 180 in an image reading operation. The liquid crystal cell 160 transmits at least a part of light 212 (FIG. 1) output from the illumination device 200 to output the light 211 toward an observer or the imaging subject 180. The thin film light sensor 102 acts as a light receiving section for receiving reflected light 213 obtained as a result of the imaging subject 180 being irradiated with the light 211 output from the liquid crystal cell 160.

The liquid crystal cell 160 includes a thin film transistor 101 as a switching element and a pixel capacitance 105. The gate line 106 is connected to a gate electrode of the thin film transistor 101, and the source line 107 is connected to a source electrode of the thin film transistor 101. The pixel capacitance 105 includes, for example, a liquid crystal capacitance and a storage capacitance (not shown) provided parallel to the liquid crystal capacitance. The liquid crystal capacitance includes, for example, a pixel electrode (not shown), a counter electrode (not shown) facing the pixel electrode, and a liquid crystal layer (not shown) provided between the pixel electrode and the counter electrode. A drain electrode of the thin film transistor 101 is connected to the pixel electrode.

The thin film light sensor 102 is located in the vicinity of each of intersections of the gate lines 106 and the signal lines 108. One of two ends of the thin film light sensor 102 is connected to the corresponding gate line 106, and the other end of the thin film light sensor 102 is connected to the corresponding signal line 108 via the diode 103.

When the control section 171 (FIG. 1) applies a voltage corresponding to image information to one of the gate lines 106 and one of the source lines 107, the corresponding thin film transistor 101 is put to an ON state to apply a voltage to the pixel electrode. Thus, an image is displayed on the liquid crystal panel 110. When a prescribed voltage is applied to one of the gate lines 106, an electric current of a value corresponding to the intensity of the light incident on the thin film light sensors 102 flows from the gate line 106 to the signal lines 108 via the thin film light sensors 102 and the diodes 103. For example, as the light intensity increases, the value of the electric current increases. By detecting the value of the electric current, the intensity of the light received by the thin film light sensors 102 is detected. The diode 103 is provided for preventing the electric current from flowing from the signal lines 108 to a gate line 106 which is not selected (i.e., which is not supplied with a voltage).

Figure 3:
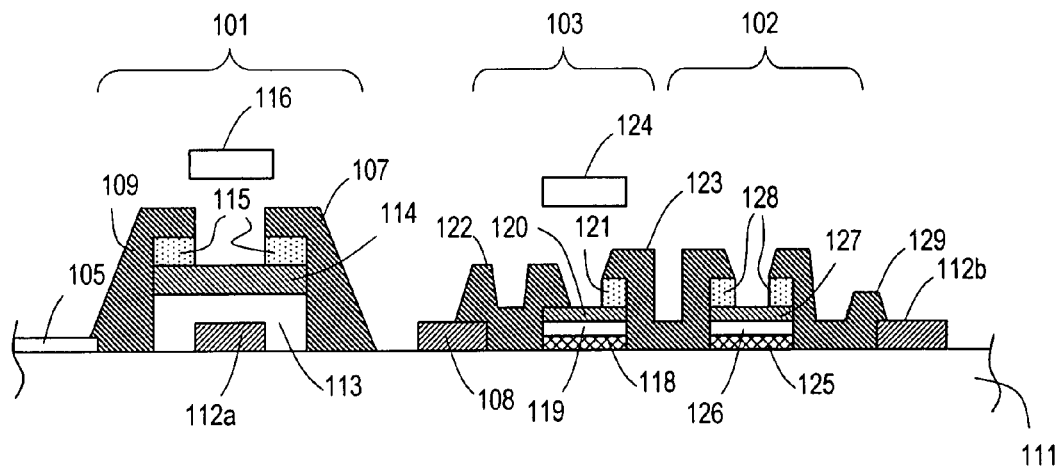
FIG. 3 schematically shows a thin film transistor and a thin film light sensor according to Embodiment 1 of the present invention.

FIG. 3 shows the thin film transistor 101 and the thin film light sensor 102 in more detail. On a substrate 111, which is one of a pair of substrates included in the liquid crystal display panel 110, the thin film transistor 101 and the thin film light sensor 102 are provided.

The thin film transistor 101 includes a gate electrode 112a, a gate insulating layer 113, a semiconductor layer 114, a highly doped layer 115, and a drain electrode 109. The gate electrode 112a is connected to the gate line 106. The drain electrode 109 and the source line 107 are connected to the semiconductor layer 114 via the highly doped layer 115. The highly doped layer 115 connected to the source line 107 acts as the source electrode of the thin film transistor 101. The drain electrode 109 is connected to the transparent pixel electrode. A light shielding film 116 is provided above a channel region of the semiconductor layer 114. The light shielding film 116 prevents malfunction caused by the semiconductor layer 114 being irradiated with external light.

The thin film transistor 102 includes a light shielding film 125, an insulating layer 126, a semiconductor layer 127, a highly doped layer 128, metal layers 123 and 129, and a gate electrode 112b. The semiconductor layer 127 is photoconductive. The gate electrode 112b is connected to the gate line 106.

The diode 103 includes a light shielding film 118, an insulating film 119, a semiconductor layer 120, a highly doped layer 121, and a metal layer 122. A light shielding film 124 is provided above the semiconductor layer 120. The metal layer 122 is connected to the signal line 108. The signal line 108 and the semiconductor layer 120 are connected to each other via the metal layer 122. The metal layer 123 and the semiconductor layer 120 are connected to each other via the highly doped layer 121. The diode 103 and the thin film light sensor 102 are connected to each other via the metal layer 123. The gate line 106 and the signal line 108 are connected to each other via the thin film light sensor 102 and the diode 103.

When a voltage is applied to the gate line 106, a voltage is applied to the gate electrode 112a of the thin film transistor 101 to form a carrier in the channel region in the semiconductor layer 114. When a voltage is applied to the source line 107 in this state, an electric current flows from the source line 107 to the drain electrode 109 via the semiconductor layer 114 to apply a voltage to the pixel electrode. By applying a voltage corresponding to image information to the gate lines 106 and the source lines 107 sequentially selected, a desired liquid crystal cell 160 is driven and thus an image is displayed.

When a voltage is applied to the gate line 106, a voltage is applied to the gate electrode 112b of the thin film light sensor 102. When the thin film light sensor 102 is irradiated with external light in this state, the semiconductor layer 127 becomes conductive. Thus, an electric current flows from the gate line 106 to the signal line 108 via the thin film light sensor 102 and the diode 103. More specifically, the electric current flows from the gate line 106 via the gate electrode 112b, the metal layer 129, the highly doped layer 128, the semiconductor layer 127, the highly doped layer 128, the metal layer 123, the highly doped layer 121, the semiconductor layer 120 and the metal layer 122 to the signal line 108.

The generation section 172 (FIG. 1) detects the intensity of light directed to each thin film light sensor 102 connected to the gate line 106 supplied with a voltage, based on the value of the electric current flowing in the corresponding signal line 108. The control section 171 (FIG. 1) applies a voltage to the gate lines 106 sequentially to switch the pixel sections 150 to an ON state or an OFF state. At the same time, the generation section 172 (FIG. 1) sequentially detects the value of the electric current flowing in each signal line 108. The generation section 172 combines the intensity of light received by each of the thin film light sensors 102 in accordance with the position of the respective thin film light sensor 102 on the liquid crystal display panel 110, to generate two-dimensional image information (color gradation pattern on the document sheet, etc.).

Next, the illumination device 200 will be described.

Figure 4A:
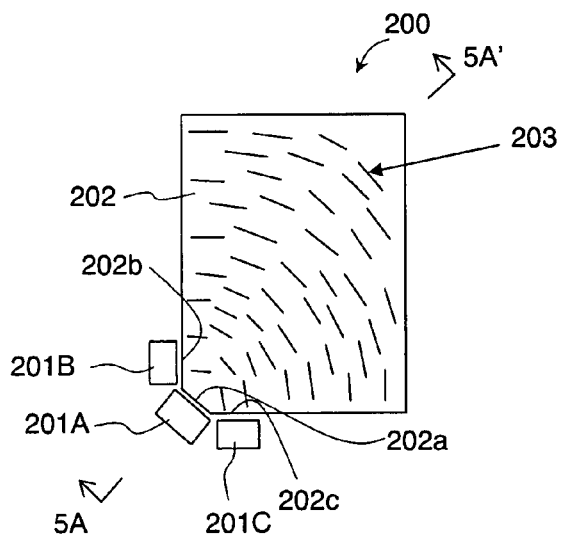
FIG. 4A is a plan view schematically showing an illumination device according to Embodiment 1 of the present invention.

FIG. 4A is a plan view schematically showing the illumination device 200. The illumination device 200 acts as a directivity adjusting section for adjusting the directivity of light which is output from the liquid crystal cell 160 (FIG. 2). The illumination section 200 includes a plurality of light sources 201A, 201B and 201C, and a light guide plate (light guide section) 202 for propagating light output from the light sources 201A, 201B and 201C and outputting the light from an outgoing face thereof toward the plurality of pixel sections 105 (FIG. 2). The plurality of light sources 201A, 201B and 201C are switchable to a first mode of selectively lighting up a part thereof, or to a second mode of lighting up at least one of the light sources which is not lit up in the first mode. Since the relative position of each light source with respect to the light guide plate 202 is different, light with a different directivity is output by changing the light source to be lit up (a part of the light sources may be lit up in either mode). Here, a mode providing a higher directivity will be referred to the "first mode", and a mode providing a lower directivity will be referred to the "second mode".

Figure 4B:
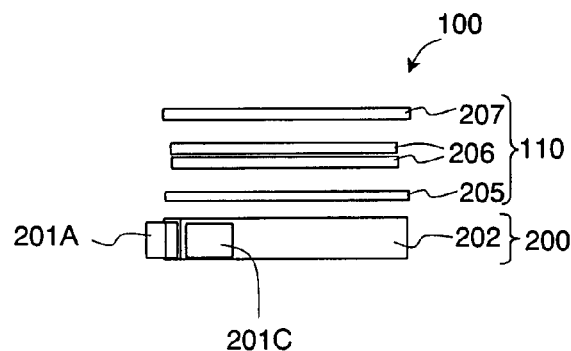
FIG. 4B shows the positional relationship between the liquid crystal display panel and the illumination device according to Embodiment 1 of the present invention.

FIG. 4B shows the positional relationship between the liquid crystal display panel 110 and the illumination device 200. The liquid crystal display panel 110 is located closer to the observer than the illumination device 200. The liquid crystal display panel 110 includes a lower polarization plate 205, a pair of glass substrates 206, and an upper polarization plate 207 arranged in this order from, for example, the side of the illumination device 200. The pixel sections 150, the gate lines 106, the source lines 107, and the signal lines 108 shown in FIG. 2 are provided on a lower glass substrate among the pair of glass substrates 206.

The light guide plate 202 of the illumination device 200 includes a first incident end face 202a provided at a corner thereof, and second incident end faces 202b and 202c which are adjacent to the corner. Among the three light sources, the light source 201A is located so as to output light toward the first incident end face 202a. The other light sources 201B and 201C are located so as to output light toward the second incident end faces 202b and 202c, respectively. As the light sources 201A, 201B and 201C, LEDs having reflectors, for example, are preferable usable.

The light guide plate 202 outputs light, which is, for example, output from the light source 201A, incident on the first incident end face 202a and propagated radially, from an outgoing face of the light guide plate 202.

Figure 5A:
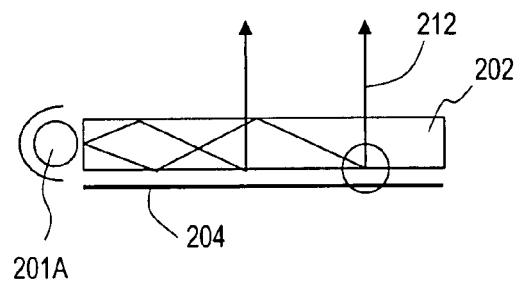
FIG. 5A is a cross-sectional view taken along line 5A-5A' in FIG. 4A.
Figure 5B:
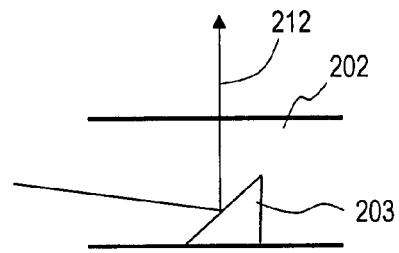
FIG. 5B is a partial enlarged view of FIG. 5A.

With reference to FIG. 4A, FIG. 5A and FIG. 5B, a structure of a light guide plate preferably usable as the light guide plate 202 will be described. FIG. 5A is a cross-sectional view taken along line 5A-5A' in FIG. 4A, and schematically shows how the light output from the light source 201A is propagated through the light guide plate 202. FIG. 5B is a partial enlarged view of FIG. 5A.

The light guide plate 202 includes microprisms 203 arranged concentrically around the light source 201A located facing the corner (the first incident end face 202a). As schematically shown in FIG. 5B, a slope surface of each microprism 203 is located so as to reflect the light 212, radially propagated from the first incident end face 202a, toward the outgoing face. As schematically shown in FIG. 4A, a ridgeline (longitudinal direction) of each microprism 203 extends in a tangential direction of the concentric circles around the light source 201A. Light incident on the light guide plate 202 from the light source 201A is propagated through the light guide plate 202 while repeating total reflection, and a part thereof is output from the outgoing face of the light guide plate 202. In order to bring back the light which has output from a rear face (opposite to the outgoing face) of the light guide plate 202, a reflection plate 204 may be provided as shown in FIG. 5A.

The microprisms 203 are provided such that the ridgelines thereof extend in the tangential direction of the concentric circles around the light source 201A. Therefore, the light 212 propagated through the light guide plate 202 radially from the light source 201A is not deflected in a direction perpendicular to such a propagation direction even if hitting the microprisms 203. Hence, the light 212 output from the outgoing face has a high directivity in a plane perpendicular to the propagation direction in the light guide plate 202. By contrast, the light 212 which is output from the light sources 201B and 201C is propagated through the light guide plate 202 while a part thereof is reflected by the microprisms 203. The propagation direction of the light 212 output from the light sources 201B and 201C is not perpendicular to the direction in which the ridgelines of the microprisms 203 extend. Therefore, such reflected light is deflected in a direction perpendicular to the propagation direction. As a result, the directivity of the light is decreased.

Figure 6:
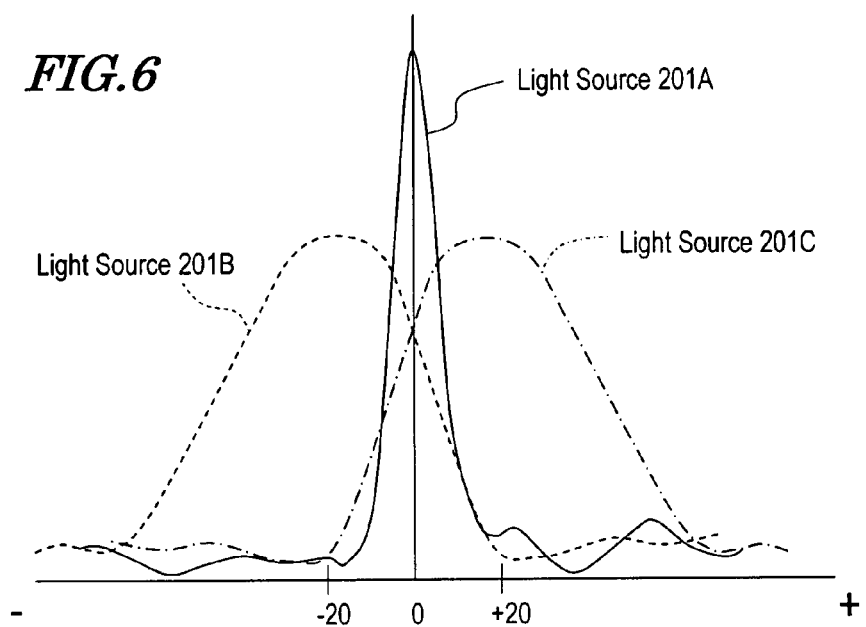
FIG. 6 is a graph showing an intensity distribution of light output from the illumination device according to Embodiment 1 of the present invention.
Figure 7:
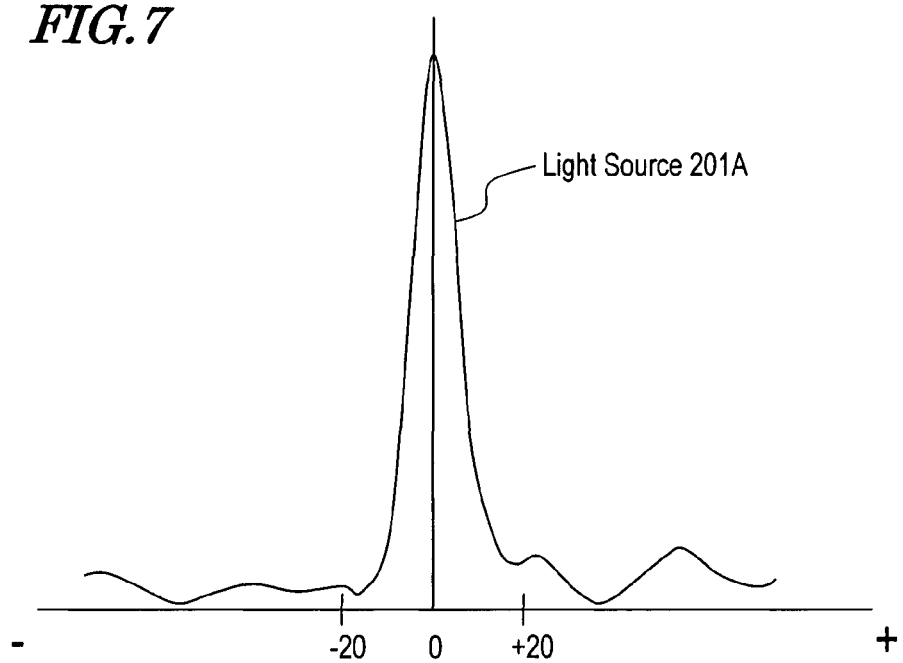
FIG. 7 is a graph showing an intensity distribution of light output from the illumination device according to Embodiment 1 of the present invention.

FIG. 6 shows an intensity distribution of the light 212 which is output from the illumination device 200 when the light sources 201A, 201B and 201C are selectively lit up one by one. FIG. 7 shows an intensity distribution of the light 212 which is output from the illumination device 200 when only the light source 201A is lit up. FIG. 6 and FIG. 7 each show the intensity distribution in a plane perpendicular to the propagation direction of the light output from the light source 201A (perpendicular to the radial direction of the circles around the light source 201A).

As clearly understood from FIG. 6 and FIG. 7, the angle of distribution of the output light when the light source 201A is selectively lit up is narrow (full width half maximum: ±10° or less). This means that the light has a high directivity and shows a highest intensity in a direction normal to the outgoing face (output angle: 0°). By contrast, the angle of distribution of the output light when the light source 201B or 201C is selectively lit up is wider (full width half maximum: about 25°) than that when the light source 201A is selectively lit up. This means that the light has a low directivity and shows a highest intensity in a direction shifted from the direction normal to the outgoing face.

Accordingly, when only the light source 201A is selectively lit up in the illumination device 200, light with a high directivity is output (first mode). The intensity distribution of the output light in this case has a maximum value in the direction normal to the outgoing face. In the first mode, the light 212 output from the illumination device 200 has a high directivity and a maximum value in the direction normal to the outgoing face. Therefore, in the first mode, the liquid crystal display apparatus 100 provides a narrow viewing angle and a high luminance in the direction normal to the screen. For an image reading operation, the illumination device 200 may be set to the first mode, so that light with a high directivity is always output from the liquid crystal cells 160 and so the resolution of the obtained image can be prevented from decreasing.

Figure 19:
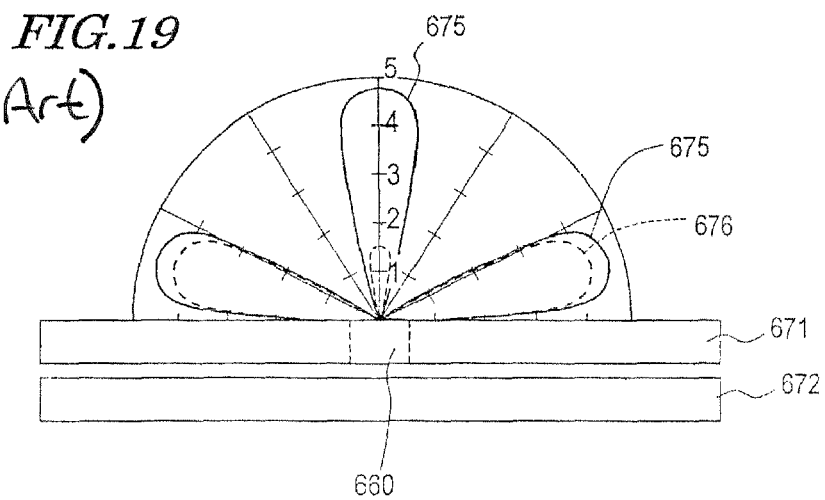
FIG. 19 shows light output from a conventional pixel section.

For an image reading operation, the control section 171 puts, to an ON state, only the liquid crystal cell 160 of a particular pixel section 150 facing a particular point on the imaging subject 180, an image of which is to be read, and puts the other liquid crystal cells 160 to an OFF state. The particular point on the imaging subject 180 is irradiated with the light 211 output from the liquid crystal cell 160 in the ON state in a direction normal thereto, and the light reflected by the particular point is received by the thin film light sensor 102 of the particular pixel section 150. As described above with reference to FIG. 19, when the directivity of the light 212 is set high, light traveling in directions close to a horizontal direction to the liquid crystal display panel 110 is suppressed both in the ON state and the OFF state. As a result, the light reflected by the other points of the imaging subject 180 is suppressed from being incident on the thin film light sensor 102 corresponding to the particular point. Therefore, the resolution of the obtained image can be prevented from decreasing.

In the second mode, for example, all the light sources 201A through 201C are lit up. The light sources 201B and 201C are located at positions different from the optimum position (where the light source 201A is located) with respect to the light guide plate 202. Therefore, the light output from these light sources is incident on the light guide plate 202 in a direction inclined with respect to the ridgelines of the prisms 203 (a direction shifted from the direction perpendicular to the ridgelines). For this reason, the light 212 from the light sources 201B and 201C is output at different angles from the light output from the light source 201A (which corresponds to the different peak positions in FIG. 6), and also has a lower directivity than the light from the light source 201A (which corresponds to the wider full width half maximum in FIG. 6).

When all the light sources 201A through 201C are lit up, light having a sum of the intensity distributions of the light from the three light sources in FIG. 6 is output. Therefore, in the second mode, the luminance of the light in the direction normal to the screen can be increased while the directivity is decreased as compared to the first mode, owing to the light from the light sources 201B and 201C. For an image display operation, the illumination device 200 may be set to the second mode, so that an image can be displayed with a wide viewing angle. This is useful when the image is viewed by a large number of people or when it is impossible to view the image from the direction normal to the screen.

As described above, the directivity of the light 212 output from the light guide plate 202 changes in accordance with the lighting pattern as a combination of the ON state and OFF state of each of the light sources 201A, 201B and 201C. When the directivity of the light 212 output from the light guide plate 202 is increased, the directivity of the light 211 output from the liquid crystal cell 160 is also increased. When the directivity of the light 212 is decreased, the directivity of the light 211 is also decreased. The illumination device 200 can adjust the directivity of the light 212 by switching each of the light sources 201A, 201B and 201C to an ON state or an OFF state in accordance with an instruction from the control section 171, and thus adjusts the directivity of the light 211. The directivity of the light 211 may be set low in an image display operation and high in an image reading operation so as to maintain the high display quality with a wide viewing angle without decreasing the resolution of an image read in the image reading operation.

For certain uses, in the second mode, one of the light sources 201B and 201C, or one of the light sources 201B and 201C together with the light source 201A, may be lit up. Alternatively, one of the light sources 201B and 201C together with the light source 201A may be lit up in the first mode, while all the light sources 201A through 201C may be lit up in the second mode.

In the illumination device 200 shown in FIG. 4A, the light sources 201B and 201C are located relatively close to the light source 201A. Alternatively, the light sources 201B and 201C may be located farther from the light source 201A, or a plurality of light sources may be provided facing each of the incident end faces 202b and 202c.

Now, another example of directivity adjusting section will be described.

Figure 8:
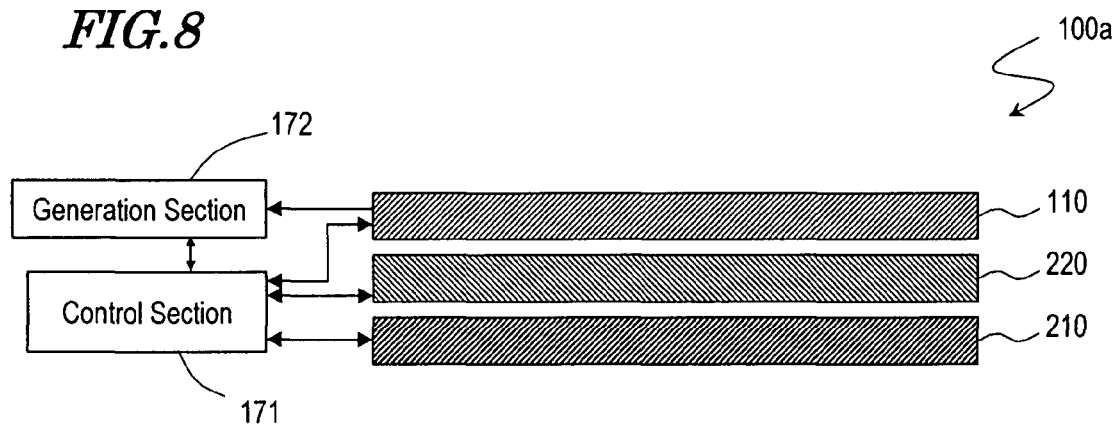
FIG. 8 schematically shows another example of liquid crystal display apparatus according to Embodiment 1 of the present invention.

FIG. 8 schematically shows another liquid crystal display apparatus 100a according to Embodiment 1 of the present invention. The liquid crystal display apparatus 100a includes a liquid crystal display panel 110, an illumination device 210, a polymer dispersed liquid crystal panel 220, a control section 171, and a generation section 172. The polymer dispersed liquid crystal panel 220 acting as a directivity adjusting section is provided between the illumination device 210 and the liquid crystal display panel 110. The illumination device 210 outputs light with a high directivity.

The polymer dispersed liquid crystal panel 220 is electrically switchable to a transmission state or a scattering state, and is controlled by the control section 171. When the polymer dispersed liquid crystal panel 220 is set to the transmission state, light output from the illumination device 210 is transmitted through the polymer dispersed liquid crystal panel 220 while keeping the directivity thereof high and reaches the liquid crystal display panel 110. Thus, light with a high directivity is output from the liquid crystal cell 160 (FIG. 2) of the liquid crystal display panel 110.

When the polymer dispersed liquid crystal panel 220 is set to the scattering state, light output from the illumination device 210 is scattered by the polymer dispersed liquid crystal panel 220 and reaches the liquid crystal display panel 110 with the directivity thereof being decreased. Thus, light with a low directivity is output from the liquid crystal cell 160 of the liquid crystal display panel 110.

In this manner, the polymer dispersed liquid crystal panel 220 may be switched to the transmission state or the scattering state to adjust the directivity of the light output from the illumination device 210, and thus adjusts the directivity of the light output from the liquid crystal cell 160.

Embodiment 2

In Embodiment 1, in the image reading operation, the pixel sections 150 are selected one by one in the image reading operation. This is time-consuming. In this embodiment, in order to shorten the time for reading an image in the image reading operation, a plurality of pixel sections 150 are selected at the same time. When light is output from adjacent pixel sections 150 at the same time, the possibility that the thin film light sensor 102 of one of the pixel sections 150 receives reflected light corresponding to the light output from the other pixel section 150 is high. In this embodiment, all the pixel sections 150 are divided into a plurality of groups such that each group includes a plurality of pixel sections 150 discretely located. For example, a plurality of pixel sections 150 located one pixel section apart, or two pixel sections apart, in a row direction and/or a column direction are grouped. Pixel sections 150 adjacent to each other belong to different groups. For an image reading operation, a plurality of pixel sections 150 belonging to the same group are selected at the same time. Since the plurality of pixel sections 150 selected at the same time are discretely located, the phenomenon that the thin film light sensor 102 of one pixel section 150 receives reflected light corresponding to the light output from another pixel section 150 is suppressed. As a result, the resolution of the obtained image can be prevented from decreasing. The generation section 172 (FIG. 1) detects the intensity of the reflected light received by each of the plurality of light receiving sections belonging to the same group on a group-by-group basis, and generates image information based on the plurality of intensities of reflected light detected on a group-by-group basis.

Figure 9:
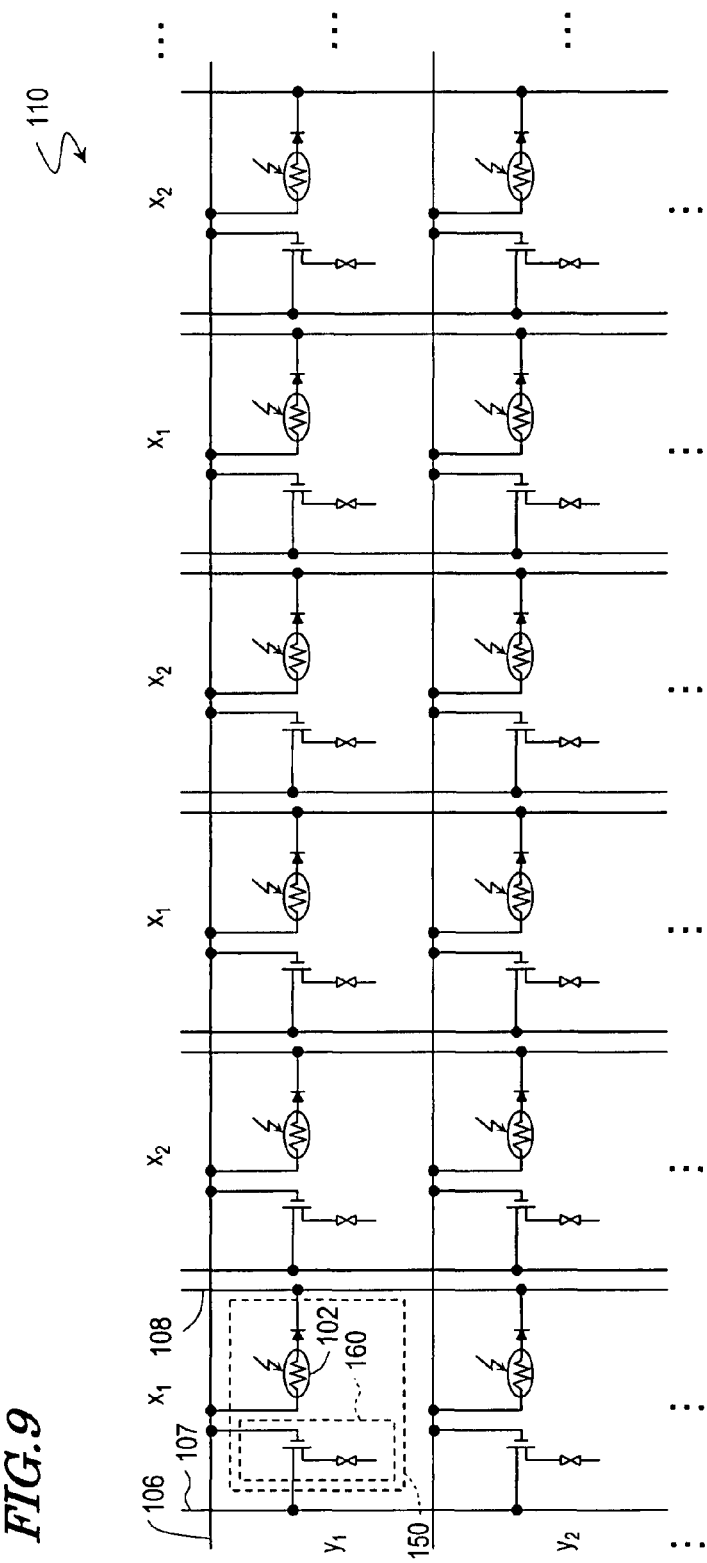
FIG. 9 schematically shows a liquid crystal display panel according to Embodiment 2 of the present invention.
Figure 10:
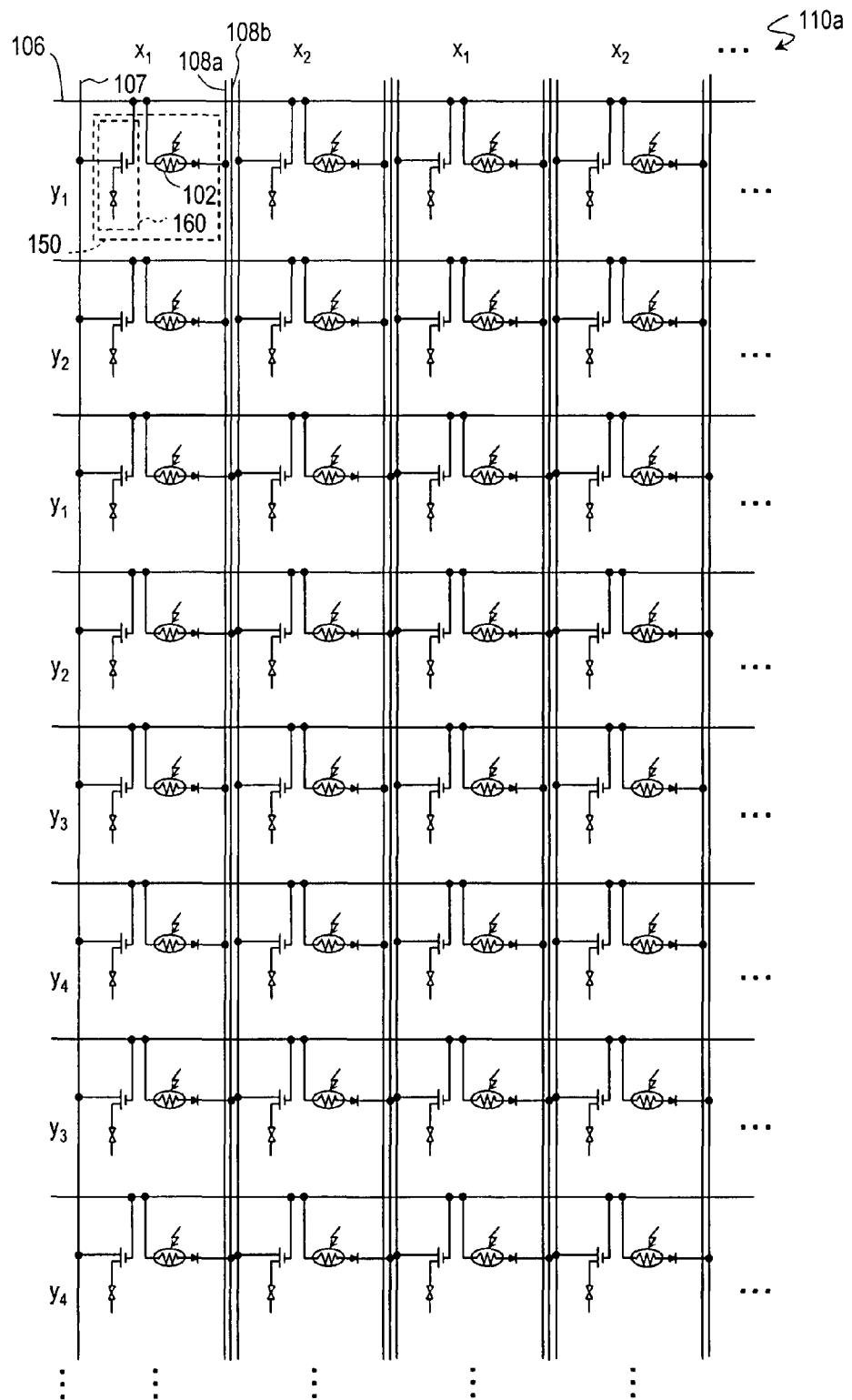
FIG. 10 schematically shows another example of liquid crystal display panel according to Embodiment 2 of the present invention.
Figure 11:
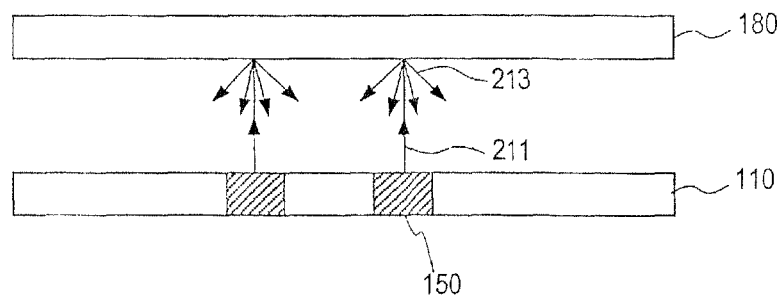
FIG. 11 schematically shows how reflected light is scattered according to Embodiment 2 of the present invention.
Figure 12:
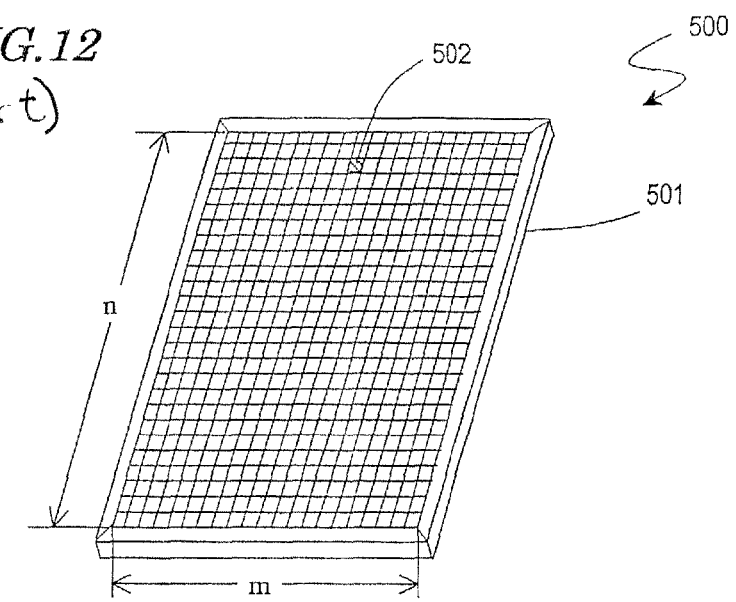
FIG. 12 schematically shows a conventional image input/output device.
Figure 13:
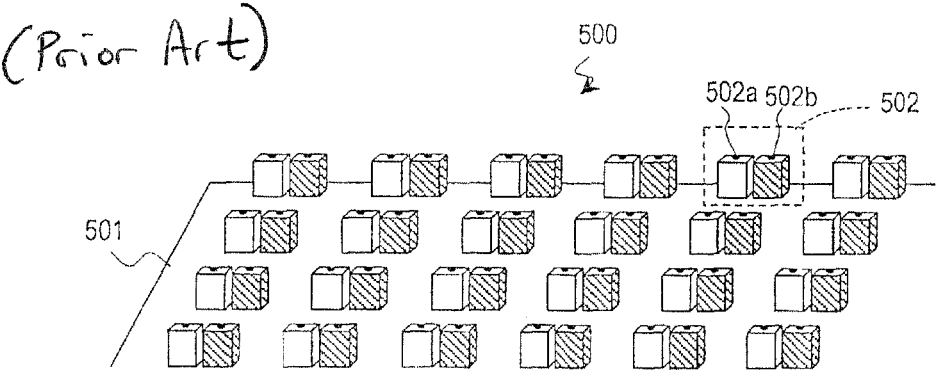
FIG. 13 schematically shows conventional pixel sections.
Figure 14A:
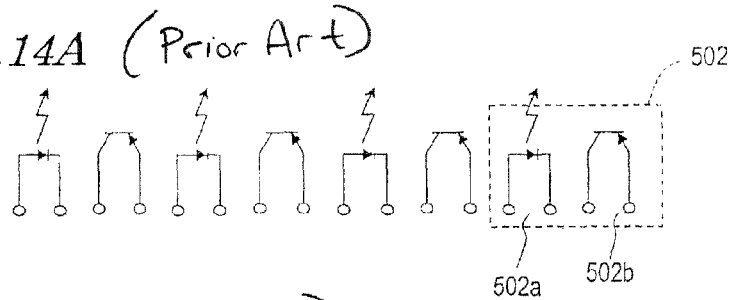
FIG. 14A shows an operation of the conventional image input/output device.
Figure 14B:
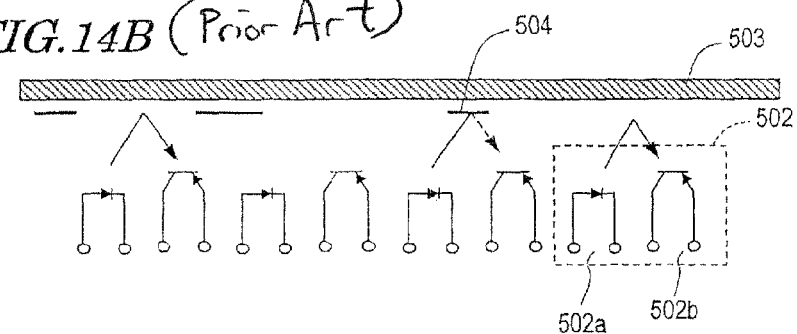
FIG. 14B shows an operation of the conventional image input/output device.
Figure 15:
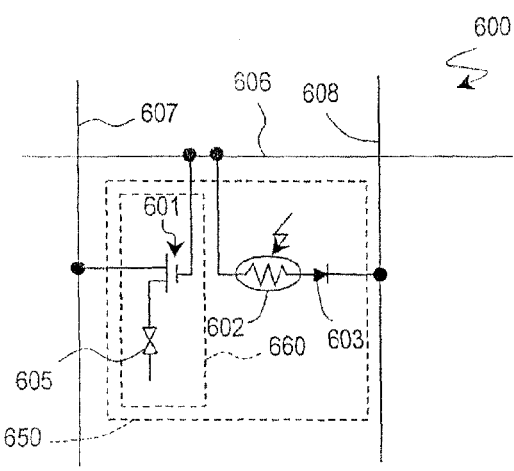
FIG. 15 schematically shows a conventional display/input liquid crystal panel.
Figure 16:
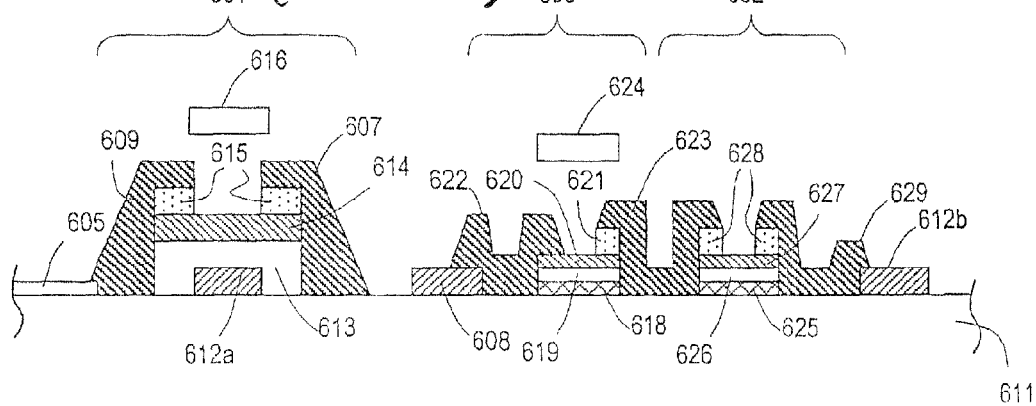
FIG. 16 schematically shows a thin film transistor and a conventional thin film light sensor.
Figure 17:
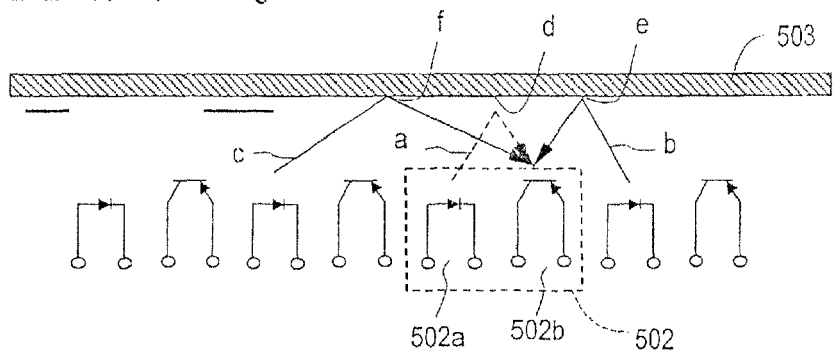
FIG. 17 shows an image reading operation of the conventional image input/output device.
Figure 18:
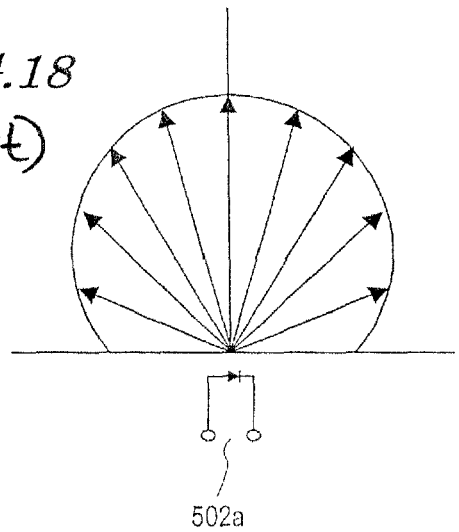
FIG. 18 shows a directivity characteristic of light output from a conventional light emitting element.

With reference to FIG. 9 through FIG. 11, the image reading operation in this embodiment will be described in more detail.

First, FIG. 9 will be referred to. FIG. 9 schematically shows a liquid crystal display panel 110. The plurality of pixel sections 150 are arranged in the row and column directions. The pixel sections 150 are labeled x1 and x2 alternately in the row direction, and are labeled y1, y2, ... yn sequentially in the column direction. Here, n is the number of pixel sections 150 provided in each column. The plurality of pixel sections 150 are divided into a plurality of groups (x1, y1), (x2, y1), (x1, y2), (x2, y2), ... (x1, yn), (x2, yn). For example, the pixel sections 150 labeled x1 and y1 belong to the group (x1, y1), and the pixel sections 150 labeled x2 and y1 belong to the group (x2, y1). The pixel sections 150 belonging to the same group (for example, the group (x1, y1)) are discretely located from each other.

In an image reading operation, the plurality of pixel sections 150 belonging to the group (x1, y1) are first selected at the same time. The light output sections 160 of the selected pixel sections 150 output light, and the thin film light sensors 102 thereof receive reflected light. The intensity of the reflected light received by each of the thin film light sensors 102 of the group (x1, y1) is detected by the generation section 172 (FIG. 1). At this time, the pixel sections 150 belonging to the groups other than the group (x1, y1) are not selected and do not output light. Alternatively, the pixel sections 150 belonging to the groups other than the group (x1, y1) may be supplied with a black display signal corresponding to black display in order to prevent those pixel sections 150 from outputting light. The generation section 172 generates light receiving information which represents the relationship between the intensity of the reflected light received by each of the thin film light sensors 102 of the group (x1, y1) and the position of the respective thin film light sensor 102 on the liquid crystal display panel 110.

Next, the plurality of pixel sections 150 belonging to the group (x2, y1) are selected at the same time. The light output sections 160 of the selected pixel sections 150 output light, and the thin film light sensors 102 thereof receive reflected light. The intensity of the reflected light received by each of the thin film light sensors 102 of the group (x2, y1) is detected by the generation section 172. The generation section 172 generates light receiving information of the group (x2, y1). Then, the pixel sections 150 belonging to the groups (x1, y2), (x2, y2), ... (x2, yn) are selected sequentially on a group-by-group basis, and light receiving information of each group is obtained. Since the pixel sections 150 belonging to the same group are discretely located, the light receiving information of each group represents a collection of fragments. The generation section 172 (FIG. 1) combines the light receiving information of each group based on the positions of the pixel sections 150 of these groups on the liquid crystal display panel 110 and forms image information representing one full image.

As described above, a plurality of pixel sections 150 located discretely are selected at the same time for an image reading operation, so that the time for image reading can be shortened and the resolution of the obtained image can be prevented from decreasing.

With reference to FIG. 10, a procedure of image reading operation for further shortening the time for image reading will be described. FIG. 10 schematically shows a liquid crystal panel 110a as another example of the liquid crystal display panel 110. The liquid crystal panel 110a includes a plurality of signal lines 108a and 108b instead of the plurality of signal lines 108 included in the liquid crystal display panel 110 (FIG. 9). The pixel sections 150 are each connected to one corresponding signal line 108a or 108b.

The plurality of pixel sections 150 are labeled x1 and x2 alternately in the row direction, and are labeled y1, y2, y1, y2, y3, y4, y3, y4, ... yp−1, yp(p=2/n) sequentially in the column direction. The plurality of pixel sections 150 are divided into a plurality of groups (x1, y1), (x2, y1), (x1, y2), (x2, y2), (x1, y3), (x2, y3) (x1, y4), (x2, y4), ... (x1, yp), (x2, yp). The pixel sections 150 belonging to the same group (for example, the group (x1, y1)) are discretely located from each other.

In the liquid crystal display panel 110a, among two pixel sections 150 belonging to the same group and also to the same column, one is connected to the signal line 108a and the other is connected to the signal line 108b. In this way, signals from a plurality of pixel sections are prevented from being output to the same signal line at the same time.

In an image reading operation, the plurality of pixel sections 150 belonging to the group (x1, y1) are first selected at the same time. The light output sections 160 of the selected pixel sections 150 output light, and the thin film light sensors 102 thereof receive reflected light. The intensity of the reflected light received by each of the thin film light sensors 102 of the group (x1, y1) is detected by the generation section 172 (FIG. 1). At this point, an electric current, corresponding to the intensity of the reflected light received by one of the two pixel sections 150 belonging to the group (x1, y1) and also to the same column, flows in the signal line 108a and is output to the generation section 172 (FIG. 1). An electric current corresponding to the intensity of the reflected light received by the other pixel section 150 flows in the signal line 108b and is output to the generation section 172. The generation section 172 generates light receiving information which represents the relationship between the intensity of the reflected light received by each of the thin film light sensors 102 of the group (x1, y1) and the position of the respective thin film light sensor 102 on the liquid crystal display panel 110. Then, the pixel sections 150 belonging to the other groups are sequentially selected on a group-by-group basis, and light receiving information of each group is obtained. The generation section 172 combines the light receiving information of each group based on the positions of the pixel sections 150 of these groups on the liquid crystal display panel 110 and forms image information representing one full image.

As described above, a plurality of pixel sections 150 arranged in the same column as well as in the same row may be included in the same group, so that the number of pixel sections which can be driven at the same time is increased. Therefore, the time for image reading can be further shortened. Since the pixel sections 150 belonging to the same group are discretely located from each other, the resolution of the obtained image can be prevented from decreasing.

In the above description, the pixel sections 150 belonging to the same group are located at every other position both in the row direction and the column direction. The degree of discreteness of the pixel sections 150 may be different between in the row direction and the column direction. The "degree of discreteness" refers to how far the pixel sections 150 belonging to the same group are apart from each other.

For example, in the case where the distance between every adjacent pixel sections 150 (i.e., the distance between every adjacent apertures) is different between in the row direction and the column direction, the degree of discreteness may be different between in the row direction and the column direction. For example, with reference to FIG. 10, one gate line 106 is provided between the pixel sections 150 adjacent to each other in the column direction. Between the pixel sections 150 adjacent to each other in the row direction, one source line 107 and two signal lines 108a and 108b (three lines in total) are provided. In this case, the distance between the adjacent pixel sections 150 in the column direction is shorter than the distance between the adjacent pixel sections 150 in the row direction. When the distance between the adjacent pixel sections 150 is shorter, the possibility that the light receiving section of one pixel section receives the reflected light corresponding to the light output from another pixel section is higher. In such a case, the degree of discreteness in the column direction may be increased as compared to the degree of discreteness in the row direction, so that the distance between the pixel sections belonging to the same group and also located in the same column can be made longer. In this way, the phenomenon that the light receiving section of one pixel section receives the reflected light corresponding to the light output from another pixel section is further suppressed.

In addition, since the width of an area where the lines are provided between the adjacent pixel sections 150 in the row direction is larger, the size of each aperture is shorter in the row direction than in the column direction. In accordance with this, the size of each light spot is shorter in the row direction and longer in the column direction. Where the size of the light spot is larger, the possibility that the light receiving section of one pixel section receives the reflected light corresponding to the light output from another pixel section is higher. For this reason also, it is desirable that in the arrangement of the pixel sections 150 shown in FIG. 10, the degree of discreteness is made larger in the column direction than in the row direction.

The plurality of pixel sections 150 are assigned R (red), G (green) and B (blue) color filters sequentially in the row direction. The pixel sections 150 assigned the same color may be included in the same group, so that an image reading operation can be carried out for each of the RGB colors. In the case where the pixel sections 150 belonging to the same column are assigned the same color, the distance between the pixel sections 150 assigned the same color is shorter in the column direction than in the row direction. In such a case, the degree of discreteness in the column direction may be set such that the distance in the column direction between the pixel sections 150 belonging to the same group is equal to or longer than the distance in the row direction between the pixel sections 150 belonging to the same group.

The number of groups is obtained as follows. It is assumed that the pixel sections belonging to the same group are located i pixel sections apart in the row direction (i is a positive integer) and j pixel sections apart in the column direction (j is a positive integer). n is the number of pixel sections 150 in the column direction. The number of signal lines provided in one column is k. In this case, the number of groups is represented as i×n/k. Assuming that the pixel sections located j pixel sections apart in the column direction belong to the same group, the number of groups is simply represented as (i+1)× (j+1). In this case, the pixel sections belonging to the same group and connected to the same signal line are driven sequentially so as not to output signals from a plurality of pixel sections to the same signal line at the same time. The generation section 172 (FIG. 1) combines the light receiving information of each group based on the positions of the pixel sections 150 of these groups on the liquid crystal display panel 110 and forms image information representing one full image.

The degree of discreteness of the pixel sections 150 belonging to the same group may be changed in accordance with the scattering degree of light reflected by the imaging subject. FIG. 11 schematically shows how the reflected light 213 is scattered. The scattering degree of the reflected light 213 varies in accordance with the material of the imaging subject 180. When the scattering degree of the reflected light 213 is higher, the possibility that the light receiving section of one pixel section receives the reflected light corresponding to the light output from another pixel section is higher. As the pixel sections are more distanced from each other, such a possibility is decreased. Therefore, in order to obtain an image with a high resolution, the degree of discreteness of the pixel sections 150 of the same group may be increased. An image with a high resolution is also obtained by increasing the directivity of the light 211. The degree of discreteness and the directivity are adjusted by the control section 171 (FIG. 1). The control section 171 directs the light 211 having a prescribed directivity from at least one liquid crystal cell 160 toward the imaging subject 180, and determines the scattering degree of the reflected light 213 based on the intensity of the reflected light received by each of the plurality of thin film light sensors 102 in the vicinity of the liquid crystal cell 160 which outputted the light 211. The control section 171 sets the degree of discreteness larger as the scattering degree of the reflected light 213 is higher. The control section 171 controls the directivity adjusting section such that the directivity is higher as the scattering degree of the reflected light 213 is higher. In this way, the degree of discreteness and the directivity are adjusted in accordance with the scattering degree of the reflected light 213, so that an image of a desired resolution is obtained.

The brightness of the light 212 output from the illumination device 200 (FIG. 1) may be different between in the image display operation and the image reading operation. For example, a clearer image is obtained by setting the brightness in the image reading operation higher than that in the image display operation. When the brightness of the light 212 is kept relatively low in the image display operation, the power consumption can be reduced.

As the embodiments of the present invention, a liquid crystal display apparatus is described above. The display apparatus according to the present invention is not limited to a liquid crystal display apparatus, and may be a self light emitting display apparatus such as an organic EL (electroluminescence) display apparatus or the like. In this case, the directivity adjusting section may be detachably provided on, for example, a surface of the display panel closer to the observer (or the imaging subject). The directivity adjusting section has a characteristic of outputting light from an outgoing face thereof after increasing the directivity of the light incident on an incident face thereof, like the directivity plate disclosed by patent document 4. In the image reading operation, the directivity adjusting section may be provided on a surface of the display closer to the imaging subject so as to direct light with a high directivity to the imaging subject. In the image display operation, the directivity adjusting section may be detached so as to display an image with a wide viewing angle.

INDUSTRIAL APPLICABILITY

The present invention provides a display apparatus capable of performing an image reading operation while maintaining the high display quality without decreasing the resolution. The present invention is especially preferably used in the fields of image display technology and image reading technology.

The invention claimed is:

1. A display apparatus for performing an image display operation and an image reading operation, the display apparatus comprising:
a plurality of pixel sections, wherein:
the plurality of pixel sections each include a light output section for outputting first light, and a light receiving section for receiving reflected light obtained as a result of an imaging subject being irradiated with the first light;
the plurality of pixel sections are divided into a plurality of groups;
each group includes the pixel sections so that each group contains a plurality of pixels;
wherein pixel sections adjacent to each other belong to different groups;
the light output section outputs the first light and the light receiving section receives the reflected light on a group-by-group basis; and
the light output sections belonging to the same group output the first light at the same time and the light receiving sections belonging to the same group receive the reflected light at the same time;
wherein among the plurality of pixel sections, the pixel sections belonging to the same group are located discretely from each other; and
a control section for controlling a degree of discreteness between the pixel sections belonging to the same group in accordance with a scattering degree of the reflected light, wherein the degree of discreteness refers to how far the pixel sections belonging to the same group are apart from each other.

2. The display apparatus according to claim 1, further comprising a generation section for detecting an intensity of the reflected light received by each of the plurality of light receiving sections belonging to the same group on a group-by-group basis, and generating image information based on the plurality of intensities of the reflected light detected on a group-by-group basis.

3. The display apparatus according to claim 1, wherein:
the plurality of pixel sections are arranged in a first direction and a second direction;
a distance between the adjacent pixel sections, among the plurality of pixel sections, is shorter in the first direction than in the second direction;
a degree of discreteness between the pixel sections belonging to same group is larger in the first direction than in the second direction; and
the degree of discreteness refers to how far the pixel sections belonging to the same group are apart from each other.

4. The display apparatus according to claim 1, wherein:
the plurality of pixel sections are arranged in a first direction and a second direction;
the plurality of pixel sections are assigned prescribed types of colors in the first direction;
a distance between the pixel sections assigned the same color, among the plurality of pixel sections, is shorter in the second direction than in the first direction;
the pixel sections belonging to the same group are assigned the same color; and
a distance between the pixel sections belonging to same group in the second direction is equal to or greater than that in the first direction.

5. The display apparatus according to claim 1, wherein:
the plurality of pixel sections are arranged in a first direction and a second direction;
among the plurality of pixel sections, the pixel sections belonging to the same group are located i pixel sections apart in the first direction (i is a positive integer) and j pixel sections apart in the second direction (j is a positive integer);
the number of the plurality of groups is (i+1)×(j+1); and
the display apparatus further comprises a generation section for detecting an intensity of the reflected light received by each of the plurality of light receiving sections belonging to the same group on a group-by-group basis, and generating image information based on the plurality of intensities of the reflected light detected on a group-by-group basis.

6. The display apparatus according to claim 1, wherein the control section sets the degree of discreteness larger as the scattering degree is higher.

7. A display apparatus for performing an image display operation and an image reading operation, the display apparatus comprising:
a plurality of pixel sections, wherein:
the plurality of pixel sections each include a light output section for outputting first light, and a light receiving section for receiving reflected light obtained as a result of an imaging subject being irradiated with the first light;
the display apparatus further comprises a directivity adjusting section for adjusting a directivity of the first light;
the directivity adjusting section sets the directivity of the first light in the image reading operation higher than the directivity of the first light in the image display operation;
the plurality of pixel sections are divided into a plurality of groups;
the light output section outputs the first light and the light receiving section receives the reflected light on a group-by-group basis;

among the plurality of pixel sections, the pixel sections belonging to the same group are located discretely from each other;

the display apparatus further comprises a control section for controlling a degree of discreteness between the pixel sections belonging to the same group in accordance with a scattering degree of the reflected light, wherein the degree of discreteness refers to how far the pixel sections belonging to the same group are apart from each other.

8. The display apparatus of claim 7, wherein the control section sets the degree of discreteness larger as the scattering degree is higher.

* * * * *